United States Patent
Geisen et al.

(10) Patent No.: US 11,305,353 B2
(45) Date of Patent: Apr. 19, 2022

(54) METHOD FOR ADDITIVELY MANUFACTURING A TIP STRUCTURE ON A PRE-EXISTING PART

(71) Applicant: Siemens Energy Global GmbH & Co. KG, Munich (DE)

(72) Inventors: Ole Geisen, Berlin (DE); Yaroslav Lebed, Berlin (DE)

(73) Assignee: Siemens Energy Global GmbH & Co. KG, Munich (DE)

( * ) Notice: Subject to any disclaimer, the term of this patent is extended or adjusted under 35 U.S.C. 154(b) by 164 days.

(21) Appl. No.: 16/630,112

(22) PCT Filed: Aug. 2, 2018

(86) PCT No.: PCT/EP2018/071012
§ 371 (c)(1),
(2) Date: Jan. 10, 2020

(87) PCT Pub. No.: WO2019/042700
PCT Pub. Date: Mar. 7, 2019

(65) Prior Publication Data
US 2021/0146444 A1  May 20, 2021

(30) Foreign Application Priority Data

Aug. 30, 2017 (EP) .................................... 17188531

(51) Int. Cl.
*B22F 10/28* (2021.01)
*B22F 10/31* (2021.01)
(Continued)

(52) U.S. Cl.
CPC ............. *B22F 10/28* (2021.01); *B22F 10/31* (2021.01); *B22F 2999/00* (2013.01);
(Continued)

(58) Field of Classification Search
CPC ...... B22F 10/28; B22F 10/31; B22F 2999/00; B22F 5/009; B22F 5/04; B22F 10/20;
(Continued)

(56) References Cited

U.S. PATENT DOCUMENTS

| 2015/0314403 A1 | 11/2015 | Bruck et al. |
| 2016/0158962 A1 | 6/2016 | Balistreri et al. |
| 2016/0167303 A1 | 6/2016 | Petelet |

FOREIGN PATENT DOCUMENTS

| CN | 107009611 A | 8/2017 |
| EP | 2601006 B1 | 6/2014 |

(Continued)

OTHER PUBLICATIONS

PCT International Search Report and Written Opinion of International Searching Authority dated Nov. 20, 2018 corresponding to PCT International Application No. PCT/EP2018/071012 filed Aug. 2, 2018.

*Primary Examiner* — Moshe Wilensky

(57) ABSTRACT

A method for additively manufacturing a tip structure on a pre-existing part includes: a) placing the part in a build space of a beam-assisted additive manufacturing setup and below a transparent aligning plate, b) engraving a top contour of the part onto the aligning plate with an energy beam of the setup, c) aligning a top surface of the part such that the top surface coincides with the engraved contour, d) removing the aligning plate from the setup, and e) additively manufacturing the tip structure according to a predefined geometry on the top surface.

5 Claims, 3 Drawing Sheets

(51) Int. Cl.
 *B33Y 10/00* (2015.01)
 *B33Y 30/00* (2015.01)
 *B29C 64/153* (2017.01)
 *B23K 101/00* (2006.01)
 *B23P 6/00* (2006.01)

(52) U.S. Cl.
 CPC ......... *B23K 2101/001* (2018.08); *B23P 6/007* (2013.01); *B29C 64/153* (2017.08); *B33Y 10/00* (2014.12); *B33Y 30/00* (2014.12); *F05D 2240/307* (2013.01)

(58) Field of Classification Search
 CPC ........ B22F 10/40; B22F 12/00; B22F 12/222; B22F 12/224; B23K 2101/001; B23P 6/007; B29C 64/153; B33Y 10/00; B33Y 30/00; F05D 2240/307
 See application file for complete search history.

(56) References Cited

FOREIGN PATENT DOCUMENTS

| | | |
|---|---|---|
| EP | 3124140 A2 | 2/2017 |
| EP | 3135408 A1 | 3/2017 |

METHOD FOR ADDITIVELY MANUFACTURING A TIP STRUCTURE ON A PRE-EXISTING PART

CROSS REFERENCE TO RELATED APPLICATIONS

This application is the US National Stage of International Application No. PCT/EP2018/071012 filed 2 Aug. 2018, and claims the benefit thereof. The International Application claims the benefit of European Application No. EP17188531 filed 30 Aug. 2017. All of the applications are incorporated by reference herein in their entirety.

FIELD OF INVENTION

The present invention relates to a method of additively manufacturing a tip structure on a pre-existing part, e.g. to an according hybrid additive manufacturing method. Further, an according apparatus is presented.

BACKGROUND OF INVENTION

Additive manufacturing techniques comprise e.g. powder bed methods, such as selective laser melting (SLM) or selective laser sintering (SLS) or electron beam melting (EBM).

A method of selective laser melting is described in EP 2 601 006 B1, for example.

EP 3 124 140 A2 further describes powder bed additive manufacturing devices and methods.

US 2016/167303 A1 describes a method for forming a three-dimensional article through successive fusion of parts of a powder bed.

US 2015/314403 A1 describes an arrangement for laser deposition repair of a gas turbine engine component.

Additive manufacturing methods have proven to be useful and advantages in the fabrication of prototypes or complex and filigree components, such as lightweight design or cooling components comprising mazelike internal structures. Further, additive manufacture stands out for its short chain of process steps, as a manufacturing step can be carried out directly based on corresponding CAD/CAM and/or construction data.

Powder bed manufacturing methods such as selective laser melting or selective laser sintering are relatively well known methods for fabricating, prototyping or manufacturing parts or components from powder material, for instance. Conventional apparatuses or setups for such methods usually comprise a manufacturing or build platform on which the component is built layer-by-layer after the feeding of a layer of base material which may then be melted, e.g. by the energy of a laser beam and subsequently solidified. The layer thickness is determined by a wiper that moves, e.g. automatically, over the powder bed and removes excess material. Typical layer thicknesses amount to 20 µm or 40 µm. During the manufacture, said laser beam scans over the surface and melts the powder on selected areas which may be predetermined by a CAD-file according to the geometry of the component to be manufactured.

A problem which regularly occurs especially in the hybrid additive manufacture, i.e. the powder-bed-based manufacture of a deposit or (tip) structure on an already existing (pre-existing) or pre-manufactured part, is that an accurate alignment of the manufacturing setup or beam hardware to a top surface of the part has to be managed. Particularly a program to be scanned e.g. by an energy beam according to the geometry of the tip structure—which is e.g. predetermined by a CAD model—has to be aligned to a top surface or upper section of the part. The tip structure to be established from a powder bed onto an already existing substrate always requires a stable and accurate alignment, e.g. after the substrate or existing section is placed in to a build space and the respective powder bed.

For the mentioned accurate alignment, usually optical recognition systems are applied in the prior art. After the existing part is placed anywhere on a build plate or platform, the setup' optical recognition system particularly recognises the position of the part and aligns a 3D- or CAD model to it. However, the machine laser or electron beam system is usually calibrated relative to mounting dowels provided on the build plate. After this calibration, it is still required to accurately machine respective dowel holes in the plate from its top and in the structure to be manufactured.

This process is extremely difficult and sophisticated, including many machining operations and requires accurate machining steps. Further, accuracy of this method is not sufficient due to tolerance stacking effects.

SUMMARY OF INVENTION

It is an object of the present invention to provide means suitable to improve alignment accuracy in hybrid selective melting methods, particularly positional calibration of a tip structure to be manufactured of an already pre-existing part.

The mentioned object is achieved by the subject-matters of the independent claims. Advantageous embodiments are subject-matter of the dependent claims.

An aspect of the present invention relates to a method for additively manufacturing a tip structure on a pre-existing part as described. The method comprises placing the part in a build space of a beam-assisted additive manufacturing setup and below an aligning plate.

The setup can be selective laser melting setup or electron beam melting setup, for example.

The aligning plate is advantageously releasably attachable to the setup. The part is advantageously placed on the substrate or build plate of the setup.

The method further comprises engraving a mating or top contour or cross section of the part onto or in the aligning plate with an energy beam of the setup, such as a laser or electron beam. Expediently, the part is mounted to the setup below the aligning plate and the energy beam is then exposed to the aligning plate from the top. The engraving from the top and placing of the part below the aligning plate is particularly expedient, due to the process inherent build direction of powder bed based additive processes.

The step of placing may as well be performed after the step of engraving as mentioned, e.g. in case that the top contour of the part is already present in a digital form. In this case, the part does not necessarily need to be measured or gauged by an optical system.

The method further comprises aligning a top surface, such as a manufacturing or mating surface, of the part such that said top surface (spatially) coincides or mates with the engraved contour. This step allows for the described accurate alignment for the whole additive manufacturing process.

The method then further comprises removing the aligning plate from the setup and additively manufacturing the tip structure according to its predefined geometry—which may be present in form of a CAD-data file—on the top surface.

The method may further comprise fixing or clamping the part after the step of aligning, e.g. with a separate clamping mechanism.

With the presented method and/or the presented apparatus (see below) a very high alignment accuracy of the geometry of the part to be build on top of the already existing substrate is facilitated. In other words, the engraving or corresponding imaging allows projecting the contour of the tip of the part into the aligning plate in order to ease a later alignment with a beam or manufacturing tooling, such as a laser tooling of the setup or manufacturing device.

In contrast to an alignment as being performed in the prior art, namely an alignment which possibly aligns the laser tooling to the component, the present method allows to adapt or take geometric settings of the laser tooling and then align the pre-existing part to the tooling.

The given alignment process is very simple and very accurate, allowing for repeatable high-quality refurbishment or completion of the part or component. The presented method is further suitable to be adapted to almost any physical part geometry. The presented means further allow for placing the pre-existing part anywhere on the build plate thus allowing for increasing flexibility and simplicity of the manufacturing process.

A further aspect of the present invention relates to an apparatus for aligning a tip structure to be additively manufactured on a pre-existing part, as described. The apparatus comprises a frame defining a build space for the additive manufacture and a clamping mechanism of fixture suitable for rotationally and/or translationally aligning and fixing the part in the build space. The apparatus further comprises the aligning plate, wherein the aligning plate is advantageously removably attachable to a top of the frame and further suitable for imaging a top contour of the tip structure to be manufactured onto the part (cf. above).

In an embodiment, the top contour mates with the top surface.

The term "mate" may describe that the respective geometries or spatial dimensions of e.g. the (virtual) top contour and the physical top surface are congruent and/or similar or may be placed one over the other in a congruent way.

In an embodiment, the top contour mates with an initial layer of the tip structure.

In an embodiment the pre-existing part is a pre-machined part.

In an embodiment an extent of pre-machining is adjusted to the predetermined or predefined geometry of the tip structure.

This allows for expediently and advantageously exploiting the described method for hybrid additive manufacturing applied for service applications. Particularly, the given embodiments are beneficial for the refurbishment of wear and/or spare parts, e.g. of or applied in a hot gas path of turbo machines.

In an embodiment the top surface of the part is an even surface, advantageously as even that it may be placed in a powder bed of an SLM setup.

In an embodiment, the top surface is aligned horizontally with the given method.

In an embodiment, the tip structure is manufactured by selective laser melting or electron beam melting. According to this embodiment, the aligning plate is expediently susceptible to be engraved, advantageously accurately engraved with a fine resolution, by the respective laser or electron beam.

In an embodiment the part constitutes a section of a component, such as wear component, spare part of a gas turbine blade or a burner root of a gas turbine.

In an embodiment, the tip structure constitutes a tip to be manufactured for the refurbishment of said component.

The mentioned terms "part" or "components" as used herein may describe any ceramic, metallic components or plastic components. Preferably, the components represent components of a turbine, such as a gas turbine. Most advantageously, the component denotes a component applied in a turbo machine, e.g. in the flow path hardware of a gas turbine. The component is, thus, advantageously made of a superalloy or nickel-based alloy, particularly a precipitation, dispersion or age hardened alloy.

In an embodiment, the aligning plate of the apparatus has a thickness of less than 5 mm.

Minimizing thickness of the aligning plate is important to avoid inaccuracies which arise due to a vertical offset the aligning plate provides between the top surface of the part and the engraving e.g. on a top surface of the aligning plate.

In an embodiment the aligning plate is made of an optically permeable or translucent material being susceptible to be engraved by the energy beam in order to image the top surface or its contour of the part in the plate as a reference.

In an embodiment, the apparatus comprises a build plate as described above, wherein the build plate carries the frame. According to this embodiment, a dimension of the build plate advantageously coincides with the build space as described.

Advantages relating to the described method may as well pertain to the apparatus, or vice versa.

BRIEF DESCRIPTION OF THE DRAWINGS

Further features, expediencies and advantageous refinements become apparent from the following description of the exemplary embodiment in connection with the Figures.

DETAILED DESCRIPTION OF INVENTION

Figure 1:
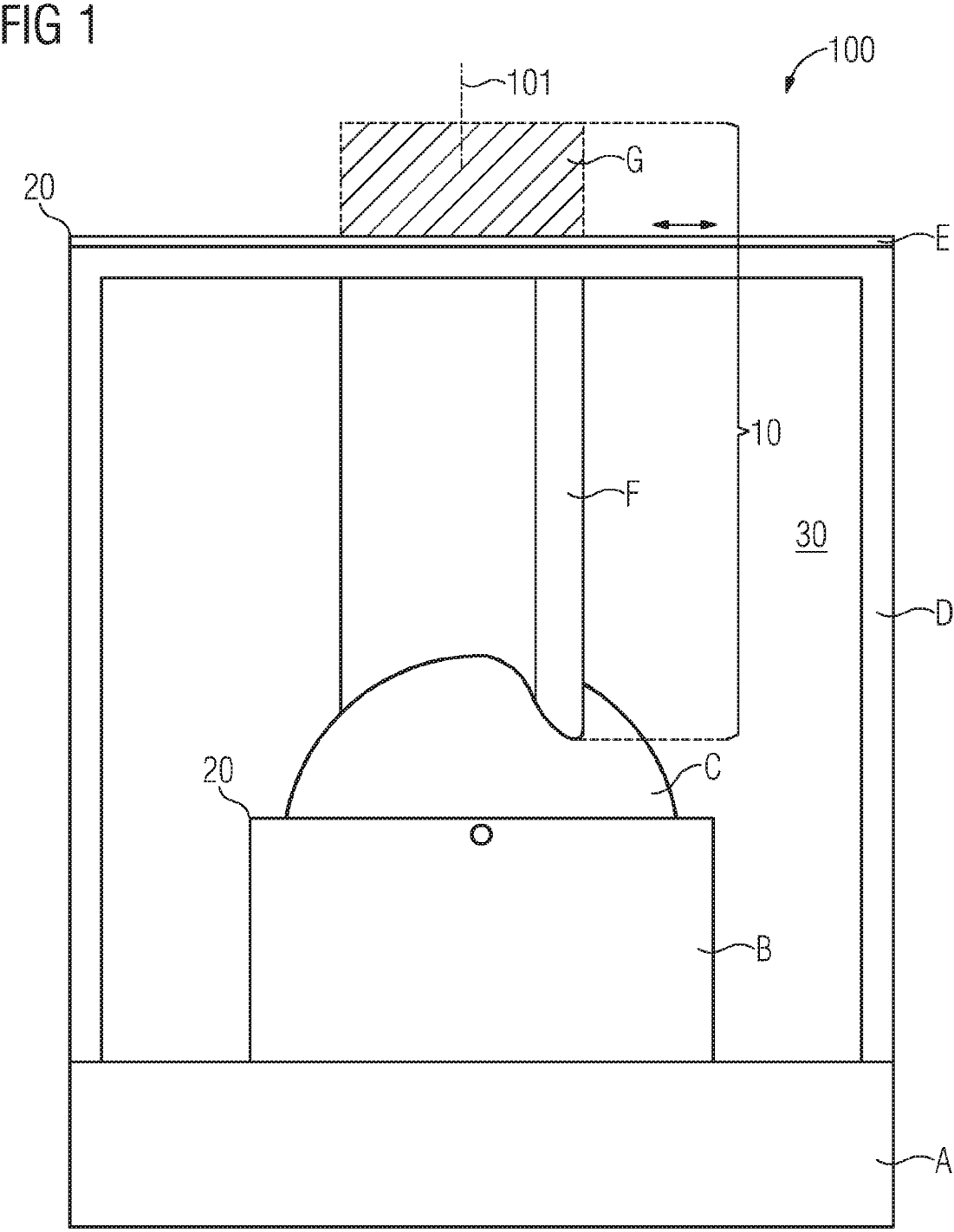
FIG. 1 shows a schematic side view of an apparatus according to the present invention.

Like elements, elements of the same kind and identically acting elements may be provided with the same reference numerals in the Figures.

FIG. 1 shows an additive manufacturing setup 100. The setup is advantageously a beam-assisted setup or device suitable for performing a selective laser melting or electron beam melting process.

The setup 100 comprises a build plate A. On top of the build plate A, a component or part to be manufactured can be placed for its manufacture.

The setup 100 further comprises an apparatus 20. Instead of the setup, the build plate A may be comprised by the apparatus 20.

The apparatus 20 further comprises a frame D which is arranged on top of the build plate A, thereby defining a build space 30 for an additive build process. In a top view of the setup 100 and/or the apparatus 20, the frame D advantageously fully spans a covers the build plate A.

Figure 2:
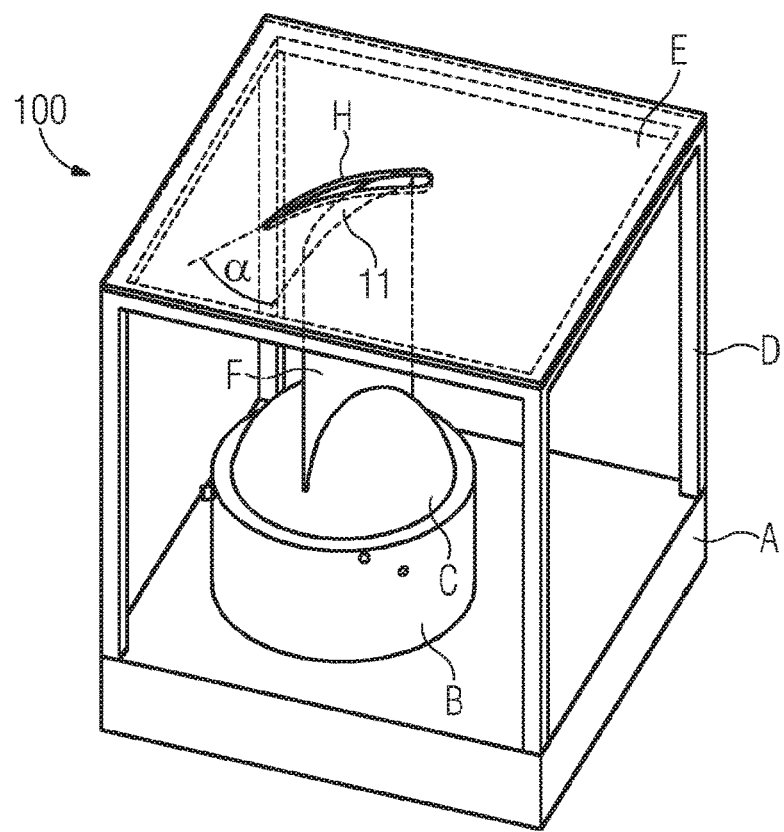
FIG. 2 shows a schematic perspective view of the apparatus in a different state.

The frame may be any stable metal frame, advantageously being open at an upper end such that an energy beam (see numeral 101) from the setup 100 can enter the build space 30 without any hindrance (cf. as well FIG. 2).

The build plate A advantageously carries the frame D. The frame D may as well be rigidly fixed to the build plate A.

The setup 100 further comprises an aligning plate E. The aligning plate E is attachable to the top of the frame D. The aligning plate E is advantageously even in shape and further removable from the setup 100, i.e. easily attachable to and removable from e.g. the frame D of the setup 100 as indicated by the double arrow in FIG. 1.

The aligning plate E is advantageously made of glass or plastics and configured to image paths of a laser or electron beam 101 for the presented method. The aligning plate E is particularly configured such that it is susceptible to be engraved by the mentioned radiation, e.g. to image a contour or cross-section of a manufacturing plane of a part F the additive manufacture shall start from.

In case of a laser beam-assisted additive manufacturing method the aligning plate E is advantageously suitable for imaging a region of it which has already been exposed with a laser beam. The same holds mutatis mutandis for a process assisted by an electron beam, i.e. electron beam melting.

The part F advantageously represents a pre-machined part, wherein an extent of pre-machining is adjusted to the predefined geometry of the tip structure G, as shown in FIG. 1. The part F may further constitute a section of a component 10, such as a turbine blade or vane or a root of a turbine burner, wherein the tip structure G constitutes a tip to be manufactured onto the part F e.g. for a refurbishment of the component 10.

The mentioned contour H may represent or indicate a junction line between the part F and the tip structure G in overall component 10, wherein this contour junction mates with the top surface 11, as well as with an initial layer of the tip structure G (see FIG. 1).

The aligning plate E is advantageously constructed very thin in thickness, e.g. with a thickness of at most 5 mm.

The aligning plate E has advantageously a uniform thickness.

Its thickness may as well amount to more than 5 mm, however advantageously less than 5 mm, such as 3 mm, 2 mm, 1 mm or even less.

The apparatus 20 further comprises a clamping mechanism comprising a clamping fixture B and a clamping fixture C. The clamping fixture B is, advantageously, a translational clamping fixture, e.g. suitable for fixing the part F and vary its position in the build space 30 along e.g. the vertical or build-up direction. The clamping fixture C is advantageously a rotational clamping fixture, i.e. suitable for fixing a part, such as the part F and vary and the orientation of the part according to any spatial direction or angle i.e. advantageously along and a azimuth angle and an elevation or declination angle in the build space 30 (see angles α and β in FIGS. 2 and 4 below).

In FIG. 1, a situation is shown, in which the pre-existing part F is placed in the build space 30. The part F is particularly placed below the aligning plate E.

Besides the presentation of the mentioned apparatus 20, an inventive method of additively manufacturing a tip structure on the pre-existing part F is described by means of the Figures. The method comprising placing the part F in the build space 30 and below the transparent aligning plate E as described above (cf. step a) in FIG. 5).

Figure 5:
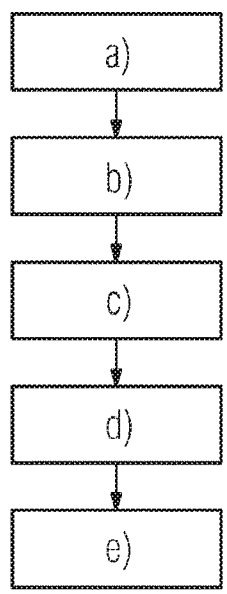
FIG. 5 indicates a schematic flow chart of method steps of the present invention.

The method further comprises engraving the contour H of the part F onto the aligning plate E with an energy beam 101 of the setup 100 (cf. FIG. 1 and step b) in FIG. 5).

The method further comprises aligning the top surface 11 of the part F such that the top surface 11 coincides or mates with the engraved contour H (cf. and step c) in FIG. 5). This is further explained by means of FIGS. 2 to 4.

FIG. 2 shows a perspective schematic view of the setup 100, wherein the aligning plate E is shown to be partly optically permeable or translucent, such that the engraved contour H and the top surface (cf. dashed line referenced with numeral 11 in FIG. 2) shining through the at least partly transparent aligning plate E, are shown. Thus, the mentioned alignment of the top surface 11 with the engraved contour, namely such that the top surface coincides with the contour, can be easily facilitated. Therefore, the clamping mechanism B, C has to be adjusted such that the shown azimuth or separation angle α by which the contour H and the part F are misaligned, vanishes. This may be performed manually or automatically.

Preferably, the top surface 11 of the part F has an even surface.

Figure 3:
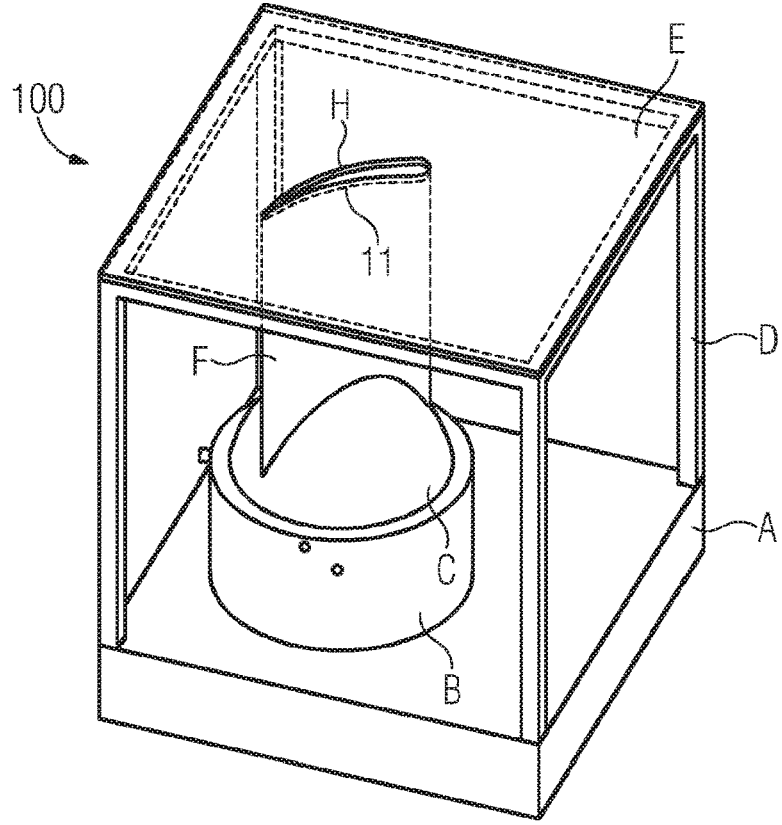
FIG. 3 shows a further schematic perspective view of the apparatus.

A result of such alignment is shown in FIGS. 1 and 3. In the perspective view of FIG. 3, the dashed line disappeared in contrast to the indication of FIG. 2, due to the congruence of the part F or—as the case may be—its top surface 11 with the engraved contour H.

As mentioned above, said aligning has advantageously been performed by a respective adjustment of the clamping mechanism B, C.

As described above, the top surface 11 is advantageously aligned horizontally and/or parallel to a surface of the alignment plate E. The top surface is, advantageously, aligned such that a single recoating step in the SLM process or setup 100 covers said surface with a powdery base material (not explicitly indicated).

Figure 4:
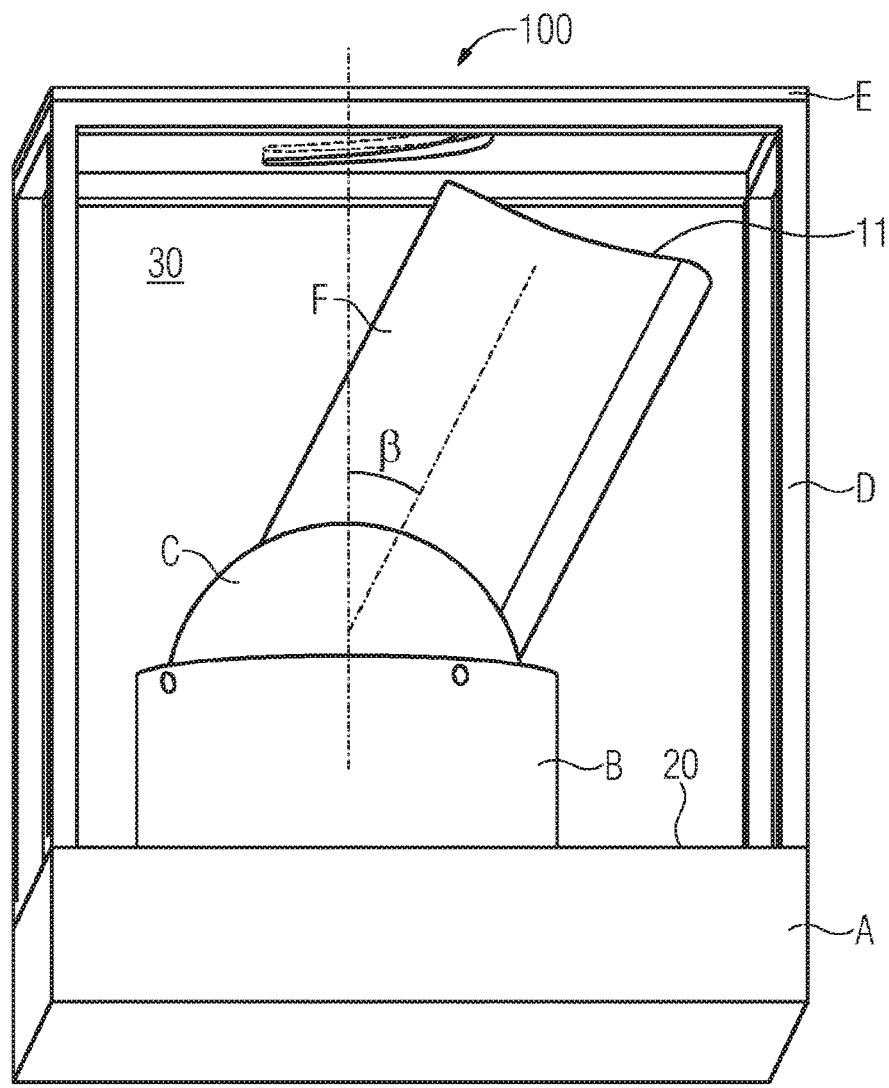
FIG. 4 shows a further schematic perspective view of the apparatus.

FIG. 4 shows a situation, in which said horizontal alignment has not yet been performed and e.g. a rotational and/or a translational alignment still has to be carried out by adjustment of the respective clamping mechanism as described above. Said adjustment has to be carried out such that the indicated declination angle β becomes zero.

The method further comprises removing the aligning plate E from the setup 100 (cf. step d) in FIG. 5).

The method further comprises additively manufacturing the tip structure G according to a predefined geometry (cf. step e) in FIG. 5). A predefined geometry for the tip structure G is indicated in FIG. 1 by means of the dashed area. The dashed area may represent a corresponding CAD-model of the tip structure G which inherently matches to the beam tooling and particularly to the engraved contour H. Consequently and necessarily, also the top surface 11 or its contour H coincides or mates with the engraved contour H, such that an accurate alignment has been provided.

Said geometry for the tip structure G is then—according to the present invention—additively manufactured on the top surface 11 of part F. This is advantageously done by means of selective laser melting or electron beam melting method and according to the predefined geometry.

The scope of protection of the invention is not limited to the examples given hereinabove. The invention is embodied in each novel characteristic and each combination of characteristics, which particularly includes every combination of any features which are stated in the claims, even if this feature or this combination of features is not explicitly stated in the claims or in the examples.

The invention claimed is:

1. A method for powder-bed-based additive manufacture of a tip structure on a pre-existing part comprising:
   a) placing the pre-existing part in a build space of a beam-assisted additive manufacturing setup and below a transparent aligning plate,
   b) engraving a top contour of the pre-existing part onto the transparent aligning plate with an energy beam of the setup,
   c) aligning a top surface of the pre-existing part such that the top surface coincides with the engraved top contour,
   d) removing the transparent aligning plate from the setup, and
   e) additively manufacturing the tip structure according to a predefined geometry on the top surface, wherein the engraved top contour mates with the top surface, and with an initial layer of the tip structure,
   wherein the aligning plate is made of an optically permeable material being susceptible to be engraved by an energy beam in order to image the contour of the tip structure.

2. The method according to claim 1, wherein the pre-existing part is a pre-machined part, and wherein an extent of premachining is adjusted to the predefined geometry of the tip structure.

3. The method according to claim 1, wherein the top surface of the pre-existing part is aligned horizontally.

4. The method according to claim 1, wherein the tip structure is manufactured by selective laser melting or electron beam melting.

5. The method according to claim 1, wherein the pre-existing part constitutes a section of a component, or a turbine blade or burner root, and wherein the tip structure constitutes a tip to be manufactured for the refurbishment of the component.

* * * * *